United States Patent

Hess

[15] 3,665,776
[45] May 30, 1972

[54] VEHICLE GEAR SHIFT MECHANISM

[72] Inventor: Stanley C. Hess, Temple City, Calif.
[73] Assignee: Superior Industries, Inc., Van Nuys, Calif.
[22] Filed: Apr. 26, 1971
[21] Appl. No.: 137,210

[52] U.S. Cl. ............................................. 74/473 P, 74/526
[51] Int. Cl. ........................................................... G05g 9/12
[58] Field of Search ...................... 74/527, 526, 473 P, 473 R, 74/471 XY, 475, 471, 473

[56] References Cited

UNITED STATES PATENTS 3,064,493  11/1962  Popovich et al. ...................... 74/473 R
3,406,586  10/1968  Hobbins ............................... 74/473 P Primary Examiner—William F. O'Dea
Assistant Examiner—F. D. Shoemaker
Attorney—Fulwider, Patton, Rieber, Lee & Utecht

[57] ABSTRACT

A vehicle gear shift mechanism of the type in which a gearshift stick is carried by mounting brackets for pivotal movement about both longitudinal and transverse axes, and in which the stick is preloaded or biased away from a generally upright position. An installation clip is provided to resist such bias and maintain the stick in the upright position necessary on installation to align the linkage ball of the stick with the shifting socket of the vehicle transmission gear actuating linkage. The clip is readily removable once installation of the shift mechanism is completed.

2 Claims, 4 Drawing Figures

Patented May 30, 1972

3,665,776

INVENTOR.
STANLEY C. HESS

BY Fulwider, Patton, Rieber,
Lee and Utecht
ATTORNEYS

VEHICLE GEAR SHIFT MECHANISM

BACKGROUND OF THE INVENTION

1. Field of the Invention

The present invention relates to vehicle gear shift mechanisms employing a spring loaded gearshift stick.

2. Description of the Prior Art

Many motor vehicles utilize a gearshift lever or stick operative through the vehicle floor to manipulate a vehicle transmission gear actuating linkage for shifting the transmission through various forward and reverse speeds. The extent of travel of the gearshift stick is often more than most sports car enthusiasts like and often the manner of operation of the shift stick is not popular, such as a shift stick that must be urged downwardly to operate reverse gear.

The sports car drivers' penchant for abbreviated gearshift stick travel, for "custom" stick configurations, and for elimination of gearshift sticks not requiring depression for reverse gear operation has encouraged the marketing of specialized gear shift mechanisms for do-it-yourself or home installation.

One of the problems associated with user-installed gear shift mechanisms is that the mechanisms often are spring loaded so that the gearshift stick is biased from the reverse and first gear side of the conventional "H" shifting pattern to the second and third gear side thereof. This tends to misalign the gearshift stick relative to the vehicle gear actuating linkage when the replacement mechanism is being installed. Alignment is difficult because this internal spring loading must be overcome while yet holding the replacement mechanism firmly enough to insert and tighten the installation bolts. Such difficulties undesirably tend to discourage the sale of do-it-yourself gearshift mechanism kits.

SUMMARY

According to the present invention a vehicle gear shift mechanism of the aforementioned spring loaded type is provided with a transversely oriented clip which includes portions on opposite sides of the stick to constrain the stick against pivotal movement about a transverse axis, the clip also holding the stick against the bias of the pre-loading spring to constrain the stick against pivotal movement about a longitudinal axis. With this arrangement, the clip is operative to generally orient the gearshift stick in an upright position for alignment of the gearshift stick linkage ball with the linkage socket of the gear actuating linkage located below the floor level of the vehicle. The clip is thus effective to maintain the gearshift stick in proper position for easy installation by a novice mechanic or do-it-yourselfer, and is quickly removable after the installation is completed so as to permit normal pre-loading of the gearshift stick during shifting operations.

Other objects and features of the invention will become apparent from consideration of the following description taken in connection with the accompanying drawing.

DESCRIPTION OF THE PREFERRED EMBODIMENT

Figure 1:
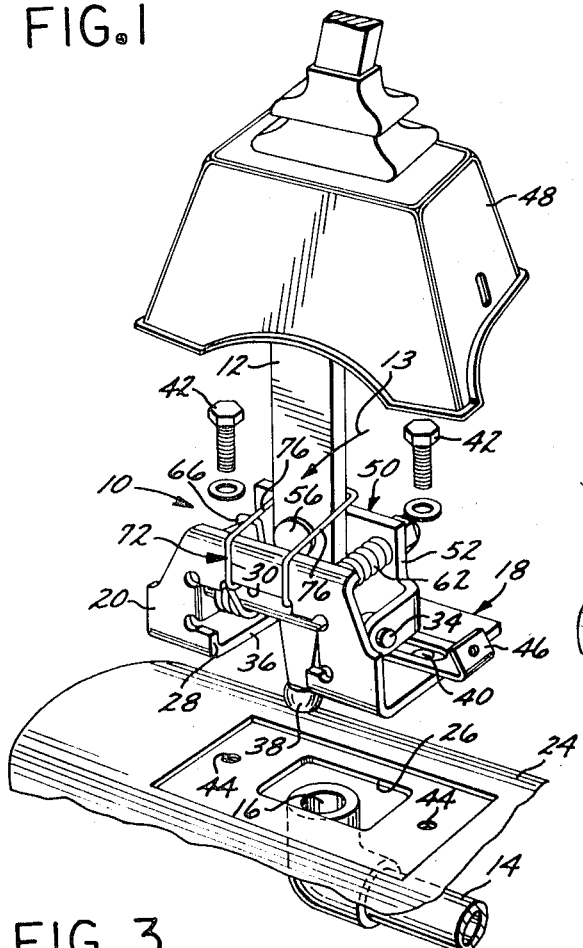
FIG. 1 is a perspective view of a gearshift mechanism, including installation clip, according to the present invention, viewed as the same would appear just prior to installation.

The present vehicle gear shift mechanism, generally indicated by the numeral 10, is particularly applicable for use in conjunction with transmissions of the well-known type utilizing a gearshift stick 12 movable laterally and longitudinally in a conventional H-type pattern. Moreover, although the invention is not limited in its application to the exemplary showing made herein, the transmission with which the mechanism 10 is particularly adapted includes a gear actuating linkage or torque tube 14 having an upwardly opening socket 16 in the forward extremity thereof. As is well known to those skilled in the art, this type of transmission, which is of the type used in Volkswagen automobiles, is characterized by four forward speeds arranged in an H pattern. The upper left portion of the pattern is first gear, the lower left portion is second gear, the upper right portion is third gear, and the lower right portion is fourth gear. Reverse gear in the stock or manufactured version of the automobile is engaged by depressing or downwardly urging the gearshift stick 12 to clear a reverse lock-out plate (not shown). The present gearshift mechanism 10 is usually installed as a replacement for such a stock gearshift mechanism and therefore the old shifter, including the reverse lock-out place, has to be unbolted from the vehicle floor and lifted upwardly and out of position.

As will be seen, the present mechanism 10 spring loads the stick 12 during usual gear shifting operations. This tends to reduce rattling and automatically move the stick 12 through the neutral or cross-over gate during movement of the stick from first and second speeds to third and fourth speeds of the H-type shifting pattern. In addition, the mechanism 10 includes a reverse spring arrangement which provides a strong bias against transverse movement of the gearshift stick 12 to a position to the left of the normal first and second gear positions of the stick. This prevents inadvertent entry of the stick 12 into reverse position.

The gearshift mechanism 10 comprises, generally, an L-shape base bracket 18 having an upright portion 20 and a base portion 22 adapted to rest upon the vehicle floor 24 over an opening 26 which is generally vertically aligned with the shifting socket 16 of the gear actuating linkage or torque tube 14 which is located beneath the floor 24.

The upright portion 20 includes a punched out opening 28 defined by an upper margin 30 and by a pair of inwardly turned tabs or mounts 32 which include longitudinally aligned openings mounting the opposite extremities of a longitudinally oriented shaft 34.

The base portion 20 includes a generally rectangular opening 36 forming a continuation of the opening 28 in the base upright portion 20. The opening 36 affords a space through which the stick 12 can extend for projection through the vehicle floor opening 26. A linkage ball 38 mounted to the lower end of the stick 12 is adapted to be received into the shifting socket 16 of the torque tube 14.

Figure 2:
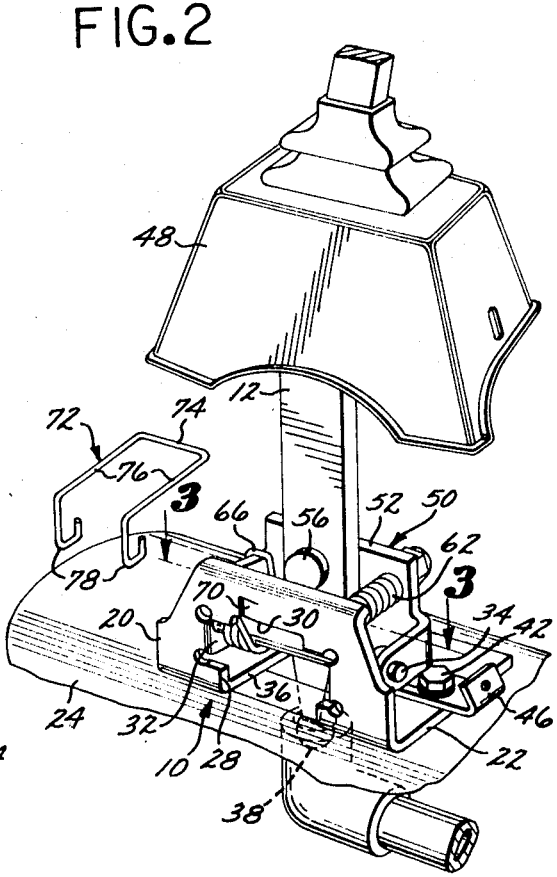
FIG. 2 is a perspective view like that of FIG. 1, but showing the mechanism after installation and with the installation clip removed.
Figure 3:
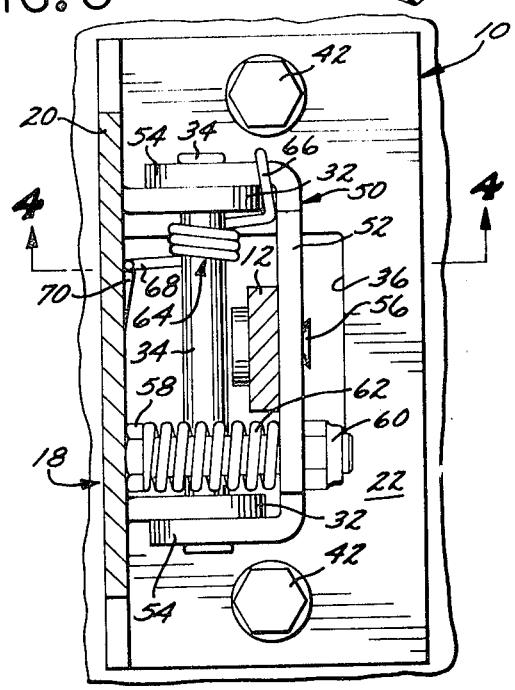
FIG. 3 is a view taken along the line 3—3 of FIG. 2.
Figure 4:
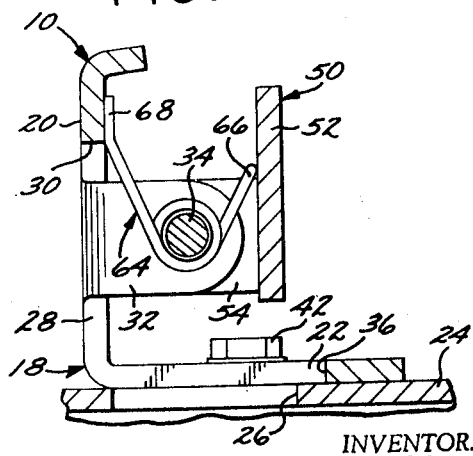
FIG. 4 is a view taken along the line 4—4 of FIG. 3.

The base portion 22 also includes a pair of openings 40 through which a pair of mounting bolts 42 extend for mounting into threaded openings 44 provided in the vehicle floor 24. A pair of cover clips 46, one of which is illustrated in FIGS. 1 and 2, are disposed over the openings 40 and include elongated slots for receipt of the bolts 42 whereby the cover clips 46 are also held in position by the bolts 42. The free ends of the clips 46 are turned upwardly and inwardly, and each includes a threaded opening to receive a machine screw or the like (not shown) for securement of a decorative housing 48 in overlying position, as illustrated.

The mechanism 10 also includes a mounting bracket 50 having a generally upright portion 52 which is laterally spaced from the base upright portion 20. The upright portion 52 includes inwardly turned tabs or mounts 54 located immediately adjacent the base mounts 32, and including longitudinally aligned openings for mounting the extremities of the shaft 34. With this arrangement, the mounting bracket 50 is pivotable on the base bracket 18 about a longitudinal axis coincident with the shaft 34.

The lower extremity of the gearshift stick 12 is pivotally mounted to the upright portion 52 of the mounting bracket 50 by a double headed stub shaft 56.

The mounting bracket upright portion 52 includes an opening which slidably receives the shank of a laterally oriented reverse spring bolt 58. The head end of the bolt 58 is adapted to engage the inner surface of the base bracket upright portion 20, while the opposite end of the bolt 58 carried a nut 60. A relatively high spring rate compression spring 62 is interposed between the head of the bolt 58 and the inner surface of the mounting bracket upright portion 52 and operates to project the bolt 58 outwardly so that the head thereof acts as a stop to limit pivotal movement of the bracket 50 in the direction of the arrow 63 in FIG. 1.

The gearshift stick 12 is preloaded by a coil spring 64 which is disposed about the shaft 34. One end of the spring 64 is reversely bent to form a loop 66 which extends over the upper edge of the forward one of the mounts 54. The spring opposite end 68 rests against the inner surface of the base bracket upright portion 20, being constrained against longitudinal movement by engagement with an inwardly punched or deformed stop 70 integral with the upright portion 20.

With the foregoing arrangement, the spring 64 tends to bias the gearshift stick 12 in a direction opposite that of the arrow 63 in FIG. 1. Consequently, if no provision were made to prevent it the uninstalled gearshift linkage ball 38 would be out of vertical alignment with the shifting socket 16. Moreover, because of the freedom of the uninstalled stick 12 to pivot about a transverse axis, it would also be possible for the ball 38 to be out of longitudinal alignment with the shifting socket 16. Such misalignment would make installation of the mechanism 10 difficult since the installer would have to press the base bracket 18 and stick 12 together to overcome the bias of the spring 64 and also try simultaneously to install the mounting bolts 42.

According to the present invention, an installation clip 72 is provided to constrain the stick 12 against pivotal movement during installation and allow the linkage ball 38 to be easily aligned with the shifting socket 16.

The clip 72 preferably is formed of a single length of resilient metal wire and is characterized by a generally transversely oriented, U-shape section 74 having forward and rearward leg portions 76 extending on opposite front and rear sides of the stick 12, with the intermediate portion of the section 74 extending around the stick 12. The free extremities of the leg portions 76 are downwardly turned and each includes an end hook 78 which is disposed over and upwardly of the upper margin 30 of the opening 28 in the base bracket upright portion 20. The leg portions 76 tend to constrain the stick 12 against pivotal movement about a transverse axis, while the section 34 holds the stick 12 in a generally upright position against the bias of the spring 64, thus constraining the stick 12 and bracket 50 against pivotal movement about a longitudinal axis.

Once the base bracket 18 is secured in position by the mounting bolts 42, the installation clip 72 can be removed from the base upright portion 20 and the stick 12 by slightly deforming it, after which the clip can be discarded. The stick 12 is then released so that the bias of the spring 64 then tends to move the stick 12 in a direction opposite that of the arrow 63 in FIG. 1 in the desired spring loaded arrangement.

Various modifications and changes may be made with regard to the foregoing detailed description without departing from the spirit of the invention.

I claim:

1. In a vehicle gearshift mechanism having a base bracket for location over the gear actuating linkage socket; a mounting bracket carried by said base bracket for pivotal movement about a longitudinal axis; and a gearshift stick carried by said mounting bracket for pivotal movement about a transverse axis, said stick extending below said base bracket and having a linkage ball at its lower extremity for disposition in said linkage socket, the improvement comprising: a spring disposed between said base and mounting brackets and operative to bias the upper portions of said brackets apart, thereby tending to dispose said linkage ball out of transverse alignment with said linkage socket during installation of said gearshift mechanism; and a transversely oriented installation clip having forward and rearward leg portions removably mounted to said base bracket and extending on opposite sides of said stick to constrain said stick against pivotal movement about a transverse axis, said leg portions extending around a portion of said stick and holding said stick against the bias of said spring to constrain said stick against pivotal movement about a longitudinal axis whereby said linkage ball is generally oriented for alignment with said linkage socket during said installation.

2. The improvement in accordance with claim 1 wherein said clip is formed of a single length of metal wire easily deformable for deliberate demounting from said base bracket subsequent said installation.

* * * * *